US008662983B2

(12) United States Patent
Wadleigh

(10) Patent No.: US 8,662,983 B2
(45) Date of Patent: Mar. 4, 2014

(54) ELECTRONIC GAME AND SYSTEM HAVING OVERLAYED VIDEO IMAGES

(75) Inventor: William R. Wadleigh, Naperville, IL (US)

(73) Assignee: WMS Gaming Inc., Waukegan, IL (US)

( * ) Notice: Subject to any disclaimer, the term of this patent is extended or adjusted under 35 U.S.C. 154(b) by 2602 days.

(21) Appl. No.: 10/659,581

(22) Filed: Sep. 9, 2003

(65) Prior Publication Data

US 2005/0054423 A1 Mar. 10, 2005

(51) Int. Cl.
*A63F 9/24* (2006.01)
*G06F 17/00* (2006.01)

(52) U.S. Cl.
USPC ................................ 463/20; 463/25; 446/397

(58) Field of Classification Search
USPC ...................................................... 463/20, 25
See application file for complete search history.

(56) References Cited

U.S. PATENT DOCUMENTS

| | | | | |
|---|---|---|---|---|
| 5,430,496 | A | 7/1995 | Silverbrook | 348/589 |
| 5,627,952 | A | 5/1997 | Silverbrook | 395/135 |
| 6,052,648 | A | 4/2000 | Burfeind et al. | 702/3 |
| 6,270,411 | B1 | 8/2001 | Gura et al. | 463/20 |
| 6,375,570 | B1 * | 4/2002 | Poole | 463/31 |
| 6,506,114 | B1 * | 1/2003 | Estes et al. | 463/16 |
| 6,517,433 | B2 * | 2/2003 | Loose et al. | 463/20 |
| 6,554,703 | B1 | 4/2003 | Bussick et al. | 463/20 |
| 6,554,704 | B2 * | 4/2003 | Nicastro et al. | 463/20 |
| 6,565,433 | B1 | 5/2003 | Baerlocher et al. | 463/20 |
| 6,942,574 | B1 * | 9/2005 | LeMay et al. | 463/41 |
| 7,195,559 | B2 * | 3/2007 | Gilmore et al. | 463/20 |
| 2003/0027489 | A1 * | 2/2003 | Kay | 446/397 |
| 2003/0064800 | A1 * | 4/2003 | Jackson et al. | 463/30 |

* cited by examiner

*Primary Examiner* — Paul D'Agostino
(74) *Attorney, Agent, or Firm* — Nixon Peabody LLP

(57) ABSTRACT

An electronic game system (100, FIG. 1) displays game element images (246, FIG. 2) within multiple game element areas (240). If a triggering event occurs (312, FIG. 3), a set of video images (402, FIG. 4) is overlayed over one or more of the game element images. Portions of the game element images may be visible during at least a portion of the duration of the set of video images. Various game element images (504, FIG. 5) can be replaced with altered images (608, FIG. 6) and/or other game element images (702, FIG. 7) while the set of video images is being displayed, thus causing the appearance that the set of video images is interacting with the game elements. Embodiments are incorporated into a wagering game system, such as an electronic slot machine game.

36 Claims, 9 Drawing Sheets

ELECTRONIC GAME AND SYSTEM HAVING OVERLAYED VIDEO IMAGES

TECHNICAL FIELD

The inventive subject matter described herein relates generally to electronic games and systems and, more particularly, to electronic games and systems having composite images, which include video images simultaneously displayed with animated or rendered images.

BACKGROUND

Wagering games with video displays have become very popular with casino visitors, and thus are very lucrative for casino operators and game producers. Accordingly, various electronic casino games have been developed, such as electronic slot machines, for example.

Many wagering games are repetitive, by nature. For example, in an electronic slot machine, a single iteration of the game involves a player providing an input to start an electronically displayed reel spinning. The reel appears to spin for a short time and finally comes to rest on a combination of symbols. The player is then apprised of his success (i.e., how many credits the player has won or lost).

One iteration of the game takes only a few seconds. However, it is a casino operator's desire that the player will play the game for an extended length of time. After spinning the reel a number of times, however, an insufficiently stimulated player may become bored or perceive that he is not successful. That player will eventually wander off with his wallet to find more stimulating entertainment elsewhere.

Game developers have incorporated various auditory, visual, and status-related stimuli into their games to try to keep a player's interest piqued. For example, during various iterations of the game, stimulating music, lights or sounds may be provided. Because players are most likely to be attracted to the most entertaining and exciting games, there is a continuing need for producing new games with enhanced entertainment and excitement values.

SUMMARY

The inventive subject matter of this application includes methods, systems, apparatus, and computer-readable media for displaying a supplemental graphical element during execution of an electronic game.

DESCRIPTION OF THE EMBODIMENTS

Figure 1:
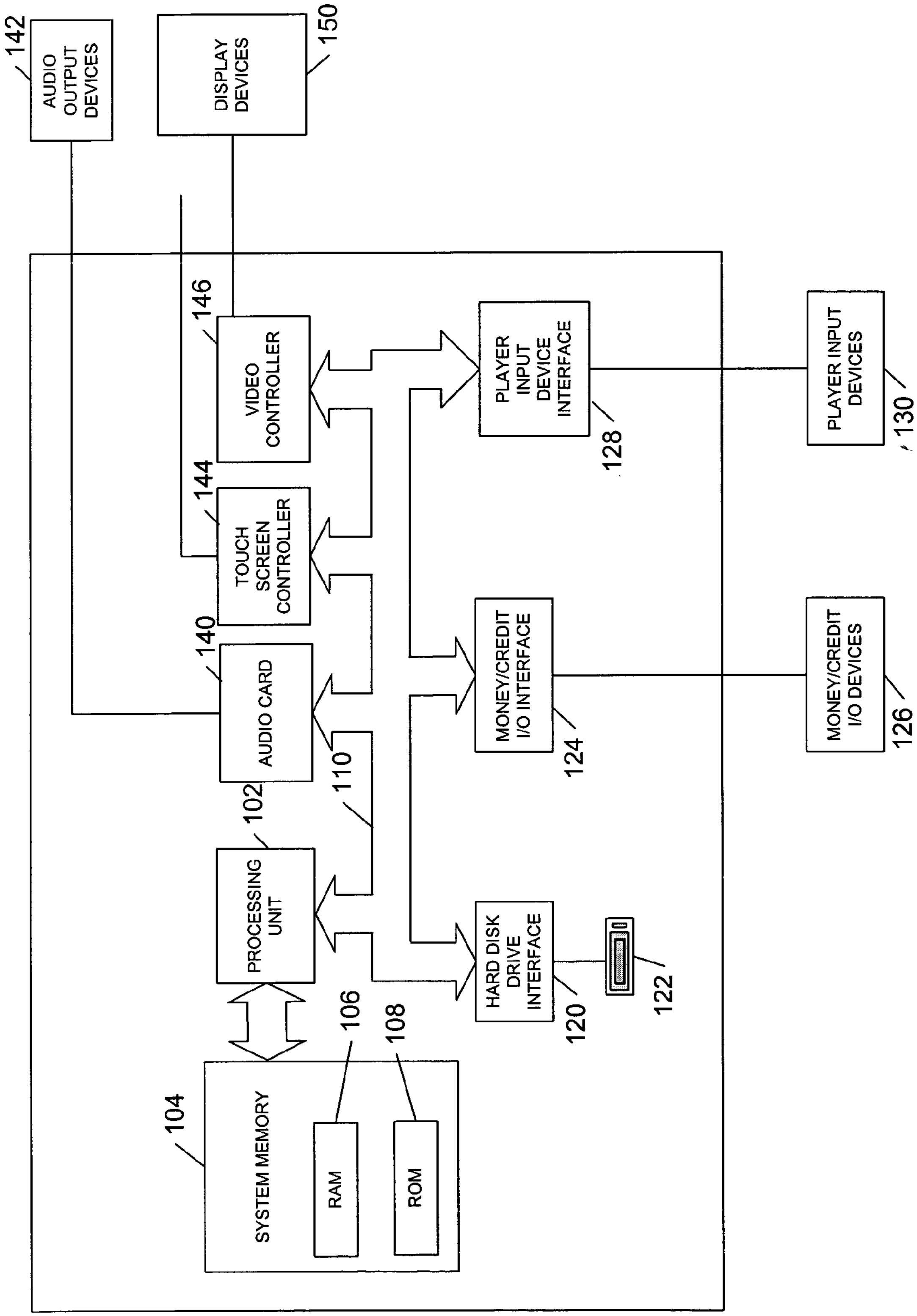
FIG. 1 illustrates a simplified, functional block diagram of an interactive gaming system, in accordance with the inventive subject matter described herein.

FIG. 1 illustrates a simplified, functional block diagram of an interactive gaming system 100, in accordance with the inventive subject matter described herein. In one embodiment, the gaming system 100 is an electronic wagering game system, such as an upright, casino-style, electronic gaming machine. In this type of machine, the player sits or stands in front of the machine, and provides various user inputs as prompted by images within a substantially vertical display area. In other embodiments, gaming system 100 could be a pub-style, electronic gaming machine. The user also sits or stands in front of this type of machine. However, the display area is viewed through a substantially horizontal surface, such as a transparent counter top surface, for example.

Referring to FIG. 1, gaming system 100 includes an element for processing information, an element for storing information, an element for accepting and dispensing money and/or credits, an element for receiving input from a player, and an element for providing a visual output to the player, in one embodiment. Each of these elements are discussed in turn, below.

The various elements are interconnected, at least in part, over a system bus 110, in one embodiment. System bus 110 may be any of several types of bus structures.

The element for processing information includes a processing unit 102, in one embodiment. The term "processing unit" is not meant to restrict the processing element to a single device. Instead, in various embodiments, the processing unit 102 includes one or more general-purpose or special purpose microprocessors, one or more application specific integrated circuits (ASICs), and/or one or more other integrated or separate processing elements.

Processing unit 102 stores and retrieves information from system memory 104, which is one of potentially several elements for storing information, in one embodiment. The term "information" is meant to include machine readable instructions and/or permanent or temporary data. The information also includes, in one embodiment, compressed or uncompressed video data, which pertains to one or more sets of video images.

Processing unit 102 executes a series of the machine readable instructions, in one embodiment, which cause a game to progress through various states and iterations, and which cause various images to be displayed by the display device 150. Processing unit 102 can communicate with system memory 104 over a dedicated link (as shown), or over the system bus 110. A link and/or memory controller (not shown) may exist between processing unit 102 and system memory 104.

In one embodiment, system memory 104 includes random access memory (RAM) 106 and read only memory (ROM) 108. Machine readable instructions for performing the methods of the various embodiments are stored in ROM 108 and/or RAM 106, in one embodiment. In addition, various permanent and/or run-time data are stored in ROM 108 and/or RAM, in one embodiment.

Another element for storing information included in the system 100, in one embodiment, is a hard disk drive 122, which is capable of reading from and writing to a hard disk (not shown). The hard disk drive 122, is connected to the system bus 110, and thus to processor 102, by a hard disk drive interface 120.

In other embodiments, where software and/or other information is stored on removable media, the element for storing information includes a magnetic disk drive (not shown) for reading from or writing to a removable magnetic disk, and/or an optical disk drive (now shown) for reading from or writing to a removable optical disk, such as a CD ROM or other optical media.

As is discussed in more detail later, the inventive subject matter described herein can be implemented in a wagering game machine. Accordingly, in one embodiment, the system 100 also includes an element for accepting and dispensing money and/or credits. In one embodiment, this includes money/credit input/output (I/O) devices 126 and money/credit I/O interfaces 124 to the system bus 110.

The money/credit I/O devices 126 includes, in one embodiment, a coin slot and bill acceptor, where a player inserts coins, tokens or paper money. In other embodiments, other devices are also or alternatively used for accepting payment, such as readers or validators for credit cards, debit cards, and/or smart cards. Other types of insertable cards are also or alternatively used, in one embodiment, including casino-issued debit cards that store information regarding a variable quantity of credits or money available to the player. In one embodiment, the money/credit I/O devices 126 also include a coin or cash dispenser, a credit voucher printer, and/or an element for crediting a credit card or debit card with a monetary amount or a quantity of credits.

After a player has entered money, in one form or another, the system 100 allows the player to play one or more iterations of a game. During play, the player manipulates various elements for receiving input from the player. These elements include, in one embodiment, player input devices 130, which include buttons and a mechanical slot-machine lever arm, which provide information to the processing unit 102 through a player input device interface 128. These types of input devices 130 are described in detail later.

In other embodiments, the player input devices 130 also or alternatively include a microphone, which interacts with speech recognition software, a mouse, a keyboard, a game controller (e.g., with toggle switches, direction buttons, etc.), and various other types of input devices. In various embodiments, these devices are integrated directly with the system, or they are interconnect with the system 100 through various ports, such as a serial port, a universal serial bus (USB) port, a parallel port, a game port or other types of ports. Accordingly, each device communicates with processing unit 102 through an appropriate interface. In still another embodiment, the element for receiving input includes the input features of a touch-screen type of display.

The element for providing a visual output to the player includes one or more display devices 150 and one or more audio output devices 142, in one embodiment. These elements communicate with processing unit 102 via a video controller or adaptor 146 and audio card 140, respectively. In addition, in an embodiment that uses touch-screen technology, the touch-screen display device 150 interacts with processing unit 102 via a touch screen controller 144.

The system 100 may operate in a stand-alone manner, or may operate in a networked environment using logical connections to one or more remote computers. Remote computers may be servers, routers, network personal computers, peer devices or other common network nodes. The logical connections include a local area network (LAN) and/or a wide area network (WAN) and/or the Internet, in various embodiments.

If used in a LAN networking environment, the system 100 connects to the local network through a network interface or adapter (not shown). If used in conjunction with a WAN or the Internet, the system 100 includes a modem (not shown) or other elements for establishing communications over the WAN or Internet. The modem is internal or external, and is connected to the system bus 110 via a serial port interface (not shown), in various embodiments. Other elements of establishing a communications link between the computers may be used. For example, in still other embodiments, the system 100 connects to one or more other computers via a wireless interface. Accordingly, the system 100 includes the appropriate wireless device hardware and software.

The system 100 described in conjunction with FIG. 1 is particular to a game machine that provides a player with entertainment in exchange for money or credit. The illustrated system is a stand-alone system, in one embodiment, which includes all necessary hardware and software for executing the game.

In other embodiments, certain features described in conjunction with the system 100 of FIG. 1 are excluded. For example, a system that does not accept or pay out money does not include money/credit I/O devices 126 or the associated interface 124, in one embodiment. Further, in another embodiment, a system simply includes a standard display and video controller, making the touch screen controller 144 unnecessary.

With or without variations, the embodiments are applicable in non-portable machines (e.g., casino or arcade machines), non-portable computer systems (e.g., desktop PCs and/or server computers), hand-held devices (e.g., hand-held gaming devices), set top box game systems (i.e., game systems that use a television as a display device), multi-processor systems, microprocessor-based or programmable consumer electronics, network personal computers, mini-computers, mainframe computers, and the like.

The system 100 is used to execute one or more electronic games for the entertainment of the user. In various embodiments, these games include, for example, electronic implementations of various wagering games, such as a slot machine, bingo or keno game, craps game, roulette wheel, card game (e.g., video poker and blackjack), game show, racing game, and trivia game. In other embodiments, other wagering or non-wagering games are executable in conjunction with the gaming system 100. For example, but not by way of limitation, the inventive subject matter described herein can be implemented in a chase game, a course navigation game, and numerous other types of games.

For purposes of description, and not by way of limitation, the description below describes the inventive subject matter described herein being implemented in a wagering game system, which executes an electronic slot machine game. Accordingly, the electronic slot machine includes the controls, displays, and features of a conventional slot machine, except that the mechanical reels and other status indicators are replaced with images displayed on an electronic display device. The focus of the description is not meant to limit application of the inventive subject matter only to a wagering game system that implements an electronic slot machine game.

Figure 2:
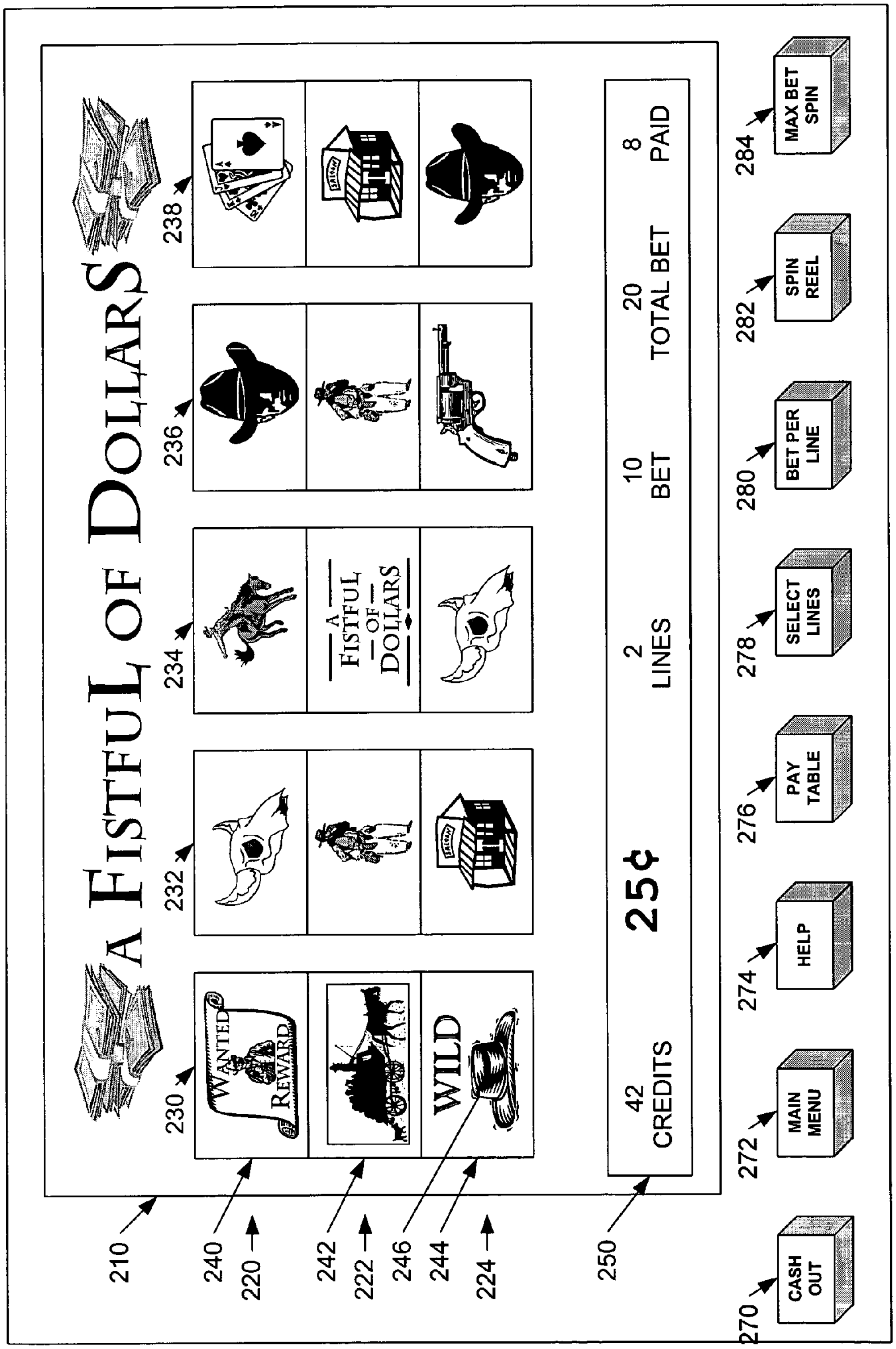
FIG. 2 illustrates an example display screen and player input buttons for an electronic slot machine game, in accordance with the inventive subject matter described herein.

FIG. 2 illustrates an example display screen and player input buttons for an electronic slot machine game, in accordance with the inventive subject matter described herein. A portion 200 of the electronic slot machine appears to the player as illustrated. The game includes an electronic display area 210, which displays multiple "reels" 230, 232, 234, 236, 238, where each reel includes multiple symbol areas. For example, a first reel 230 includes three symbol areas 240, 242, 244, which are arranged in a vertical relationship. A particular symbol area can be specified by an identity of a specific reel 230-238 and a specific row 220-224. The illustrated embodiment shows five reels 230-238, with three symbol areas 240-244 within each reel. In other embodiments, more or fewer reels and/or symbol areas are included. In one embodiment, each symbol area has a regular, geometric shape, such as a rectangle (as illustrated), a square, a circle, an oval, etc.

A "symbol" is displayed within each symbol area. A symbol may or may not fill an entire symbol area. If a symbol does not fill an entire symbol area, background filler may be used to fill in the remaining portion of the symbol area. As defined herein, a "symbol" includes the complete set of pixels within a symbol area, whether or not a pixel corresponds to the actual symbol or to a plain or patterned background.

A symbol is an image, which typically includes a rendered (i.e., illustrated) image or a real image, in various embodiments. Each reel displays a plurality of symbols within a plurality of symbol areas. At any particular time, all of the symbols within a reel can be different, or two or more of the symbols can be identical. In one embodiment, symbols are static images when the reels are at rest. In another embodiment, symbols are animated when the reels are at rest, or the images otherwise change without altering the identity of the symbol (e.g., a cow skull is still a cow skull even if it changes color or size).

Symbols can be, for example, bells, hearts, fruits, characters, numbers, letters, bars or other images, which preferably correspond to a theme associated with the game. In the illustrated embodiment, the symbols correspond to a game entitled "A FistfuL of DollarS," which has a cowboy theme. For example, symbol 246, which appears on reel 230 at row 224, is a cowboy hat. Symbol 246 also represents a "Wild" symbol, which has an ambiguous value or a value that can change. Numerous other themes can be imagined by game designers.

In addition to the reels 230-238, display area 210 includes one or more information windows 250, in one embodiment. FIG. 2 illustrates a single information window 250, which includes the following information: a) a credit indicator, which displays the number of credits remaining; b) an indicia of how much money each credit is worth (in this case 25 cents); c) an indicator of how many lines the user selected to bet upon; d) an indicator of how many credits will be applied to each line; e) an indicator of the total bet (i.e., the number of lines selected times the bet per line); and f) the amount of credits that were paid during the last iteration.

Besides the above-listed examples, the information windows 250 can include other or different information. For example, the window 250 or windows can also include: g) a bonus spin indicator (not shown), which displays a number of remaining bonus spins; and/or h) a multiplier window, which indicates a multiple that will be applied to won or lost credits during the next iteration of the game.

The term "game element" is defined herein to mean any portion of the display that includes a variable visual representation of something that is used to determine a game output or to represent a status. For example, each symbol area 240-244 is a game element, as that term is defined herein. In addition, the values displayed within the information window 250 each are game elements.

In one embodiment, the game also includes and a number of buttons 270-284, which enable the player to provide various inputs, and to request various outputs. The illustrated buttons include: a) a "Cash Out" button 270, which enables the player to terminate the game and receive payment for all remaining credits; b) a "Main Menu" button 272, which enables the player to access a menu of various alterable game options; c) a "Help" button 274, which enables the player to receive assistance in playing the game or interpreting the outcomes; d) a "Pay Table" button 276, which enables the player to display a table of payouts for various outcomes; e) a "Select Lines" button 278, which enables the player to select which of one or more rows 220-224 the player wishes to bet upon; f) a "Bet Per Line" button 280, which enables the player to specify how many credits will be bet for each line; g) a "Spin Reel" button 282, which enables the user to initiate an iteration of the game; and h) a "Max Bet Spin" button 284, which enables the user to apply the maximum allowable bet for the upcoming iteration. Although the above inputs are made using buttons, in the illustrated embodiment, some or all of the inputs can alternatively be made using a touch screen, a mouse position and click, a keyboard entry, or other user input elements.

In the wagering game of various embodiments, a player can initiate an iteration of the game as long as the player has at least one credit. The player initiates the game by, for example, pressing the "Spin Reel" button 282 or by pulling down on a mechanical arm (not shown). This action causes the game to simulate the spinning of the reels 230-238. Eventually, each of the reels 230-238 appear to stop spinning. In an alternate embodiment, the player may cause the reels 230-238 to stop spinning by providing a "Stop Spin" input, via a button or other input elements.

When the reels appear to have stopped spinning, a symbol is displayed within each symbol area, as FIG. 2 illustrates. In one embodiment, a certain symbol or set of symbols represents a triggering event, which causes a supplemental graphical element to be displayed in a portion of the display area. For example, one or more symbols on a particular pay line can be a triggering event, or a set of scattered symbols (e.g., identical symbols anywhere on the reels) also can be a triggering event. Other types of triggering events also can be implemented, in other embodiments. For example, but not by way of limitation, triggering events can be based on the status of other game elements (e.g., number of credits, payout amount, etc.), on the occurrence of a bonus round event, or on a player input (e.g., pressing a button or pulling the lever arm).

In one embodiment, the supplemental graphical element is a set of video images. As used herein, the term "video image" means an electronically displayed version of a real image, such as a digital or film-based photograph, a frame of a motion picture or a television or video camera image. The set of video images can include from one to many video images. In one embodiment, displaying the set of video images results in the appearance of full motion video, as opposed to the appearance of a still image. In another embodiment, displaying the set of video images could result in the appearance of a still video image. In other embodiments, the supplemental graphical element is an animated or rendered image.

In one embodiment, the set of video images is displayed within or in proximity to one or more game elements, such as within one or more symbol areas. In another embodiment, all or a portion of the set of video images is displayed partially or completely outside the one or more symbol areas or other game elements. In still another embodiment, the size of the various images in the set of video images can appear to change as the set is displayed. For example, a first image can be displayed within one symbol area, and subsequent, related images can grow in relative size to be displayed within two or more symbol areas. In still other embodiments, all or portions of the set of video images can appear to move from one area of the display to another. In still other embodiments, a set of video images can appear to affect one or more of the game elements. For example, a set of video images can appear to affect the identity of one or more symbols, multipliers, bonus spin values, or other game elements.

A set of video images represents a spatially-cohesive entity, in one embodiment. In other words, a set of video images represents an entity that is contained within a boundary. In one embodiment, the shape of the boundary is configured to dynamically conform to the shape of the entity being visually represented. In another embodiment, the shape of the boundary is static. Accordingly, if the entity has an irregular shape, the boundary also has an irregular shape. For example, a set of video images can include irregularly-shaped images of a man drawing a gun and shooting, where the shapes of the images contour dynamically with the shape of the man, his clothing, and his gun.

In one embodiment, a single set of images is displayed at any given time. In another embodiment, two or more sets of images can be displayed in separate, adjacent or overlapping game elements of other portions of the display. For example, a first set of images can represent the man drawing his gun and shooting, while a second set of images can represent an explosion, within a different symbol area, which resulted from the shot. In addition, a third set of images can represent a bullet traveling from the gun to the site of the explosion. The various embodiments will now be described in detail in conjunction with FIGS. 3-9.

Figure 3:
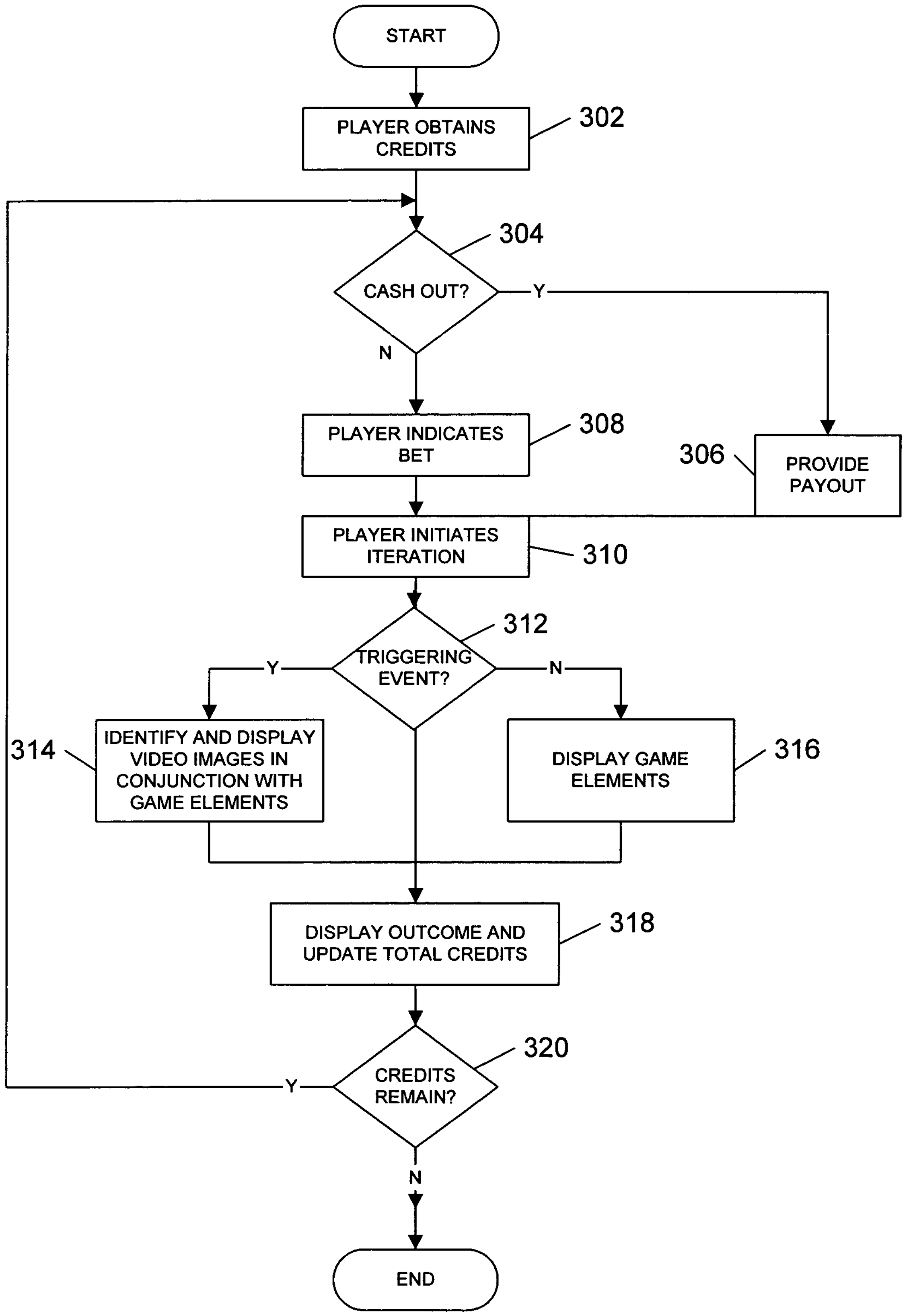
FIG. 3 illustrates a flowchart of a method for displaying a supplemental graphical element over a symbol element, in accordance with the inventive subject matter described herein.

FIG. 3 illustrates a flowchart of a method for displaying a supplemental graphical element (e.g., a series of video images) over a symbol element, in accordance with the inventive subject matter described herein. The method begins, in block 302, when a player obtains credits, thus causing the total credit counter to obtain a non-zero balance. For example, the player can insert bills, coins or tokens into the system. Alternatively, the player can insert a card with an electronically stored quantity of credits, a smart card with similar information, or a credit or debit card. Alternatively, the player can manually enter information that enables the system to collect payment.

After obtaining credits, a player may "cash out" at any time, except during an iteration of the game. If the player cashes out, as indicated in block 304, the system provides the player with a number of coins, tokens, and/or bills that correspond to the number of total credits remaining, in block 306. Alternatively, the system can issue a credit slip or credits on an electronically recordable card, or the system can credit the player's credit card. The game then terminates.

If the player has not yet cashed out, the player optionally inputs information indicating bet parameters, in block 308. For example, the player can indicate, via the "Select Lines," "Bet Per Line," and/or "Max Bet Spin" buttons 278, 280, 284 (FIG. 2), how many credits the player wants to bet per row of slot machine reels. In addition, the player can indicate how many and which rows the player wants the system to use to determine whether the player wins or loses. Initially, the system may provide a default bet (e.g., bet one credit per row), which the player can modify. In addition, each subsequent iteration can assume the same bet as the previous iteration. The player then may or may not alter the bet parameters for any given iteration.

A player can then initiate an iteration of the game, in block 310. In one embodiment, this involves the player providing an input, via a player input device (e.g., device 130, FIG. 1), indicating that the player wants the iteration to begin. For example, the player can press the "Spin Reel" button 382 (FIG. 3) to initiate an iteration of the game. Alternatively, the player can pull a mechanical lever arm or provide some other type of input to indicate that the player wishes to start an iteration.

In the electronic slot machine embodiment, when a player initiates an iteration of the game, the electronically displayed reels appear to start spinning. Eventually (or as a result of player input), the reels appear to stop spinning and come to rest. Each reel includes a multitude of symbols displayed in a multitude of symbol areas, such as is illustrated in FIG. 2. The symbols displayed are selected by the system using a symbol selection method.

In one embodiment, a determination is made, in block 312, whether a "triggering event" has occurred. A triggering event is program decision, in one embodiment, that results in a selection and subsequent display of a game element in conjunction with the display area. In one embodiment, a triggering event is the selection and display of a particular symbol, such as a "Wild" symbol, for example. In another embodiment, a triggering event can be the selection and display of multiple symbols in a particular number or arrangement. For example, but not by way of limitation, a triggering event can be the display of three of the same symbol at the same time, or the display of multiple identical symbols in a row.

If a triggering event has occurred, then in block 314, one or more sets of video images are identified and displayed within the display area. The process is described briefly, below, and in more detail later in conjunction with FIG. 8.

In one embodiment, a set of video images is displayed within one or more game elements, such as symbol areas, for example. The set of video images is overlayed over the images that would otherwise be displayed in an unaltered form within the game elements, in one embodiment. For example, the set of video images is overlayed over one or more symbols within one or more symbol areas.

As used herein, the term "overlayed" means that some or all of the video images within the set of video images appear to cover over portions of one or more game elements. In other words, the pixel color values associated with a video image replace the pixel color values for the underlying game element. In one embodiment, the overlay appears to be opaque. In another embodiment, the set of video images appears to be semi-transparent when it is overlayed. In such embodiments, the displayed pixel colors represent a combination of the color of overlayed video images and the underlying symbol. In still another embodiment, portions of the video images can appear to exist behind a symbol and/or another portion of the display.

In one embodiment, at least a portion of the underlying game element remains visible within the time frame during which the set of video images is overlayed on the game element. In one embodiment, at least a portion of the underlying game element (e.g., the underlying symbol) remains continuously visible for a substantial proportion of the video time frame. By allowing a portion of a symbol to remain visible, the player is able to retain the context of the symbol states. In other words, the player is able to substantially continuously view and understand the state of each symbol. This may provide the player with an increased feeling of confidence, than the player might have if one or more of the symbols was completely blocked from view during a significant portion of the video time frame. Accordingly, the player's feeling that the game is fair is not eroded by disappearing symbols.

Some of the embodiments discussed above are explained in more detail in conjunction with FIGS. 2 and 4-7, which illustrate example display screens showing a progression of a series of video images, in accordance with the inventive subject matter described herein. As explained previously, FIG. 2 illustrates an example of a set of symbols, which can occur as a result of a reel spin. FIG. 2 illustrates the reels 230-238 after the reels appear to have come to rest.

In the bottom row 224 of the leftmost reel 230, the symbol 246 displayed within symbol area 244 is a "Wild" symbol. In one embodiment, a "Wild" symbol represents a triggering event.

Figure 4:
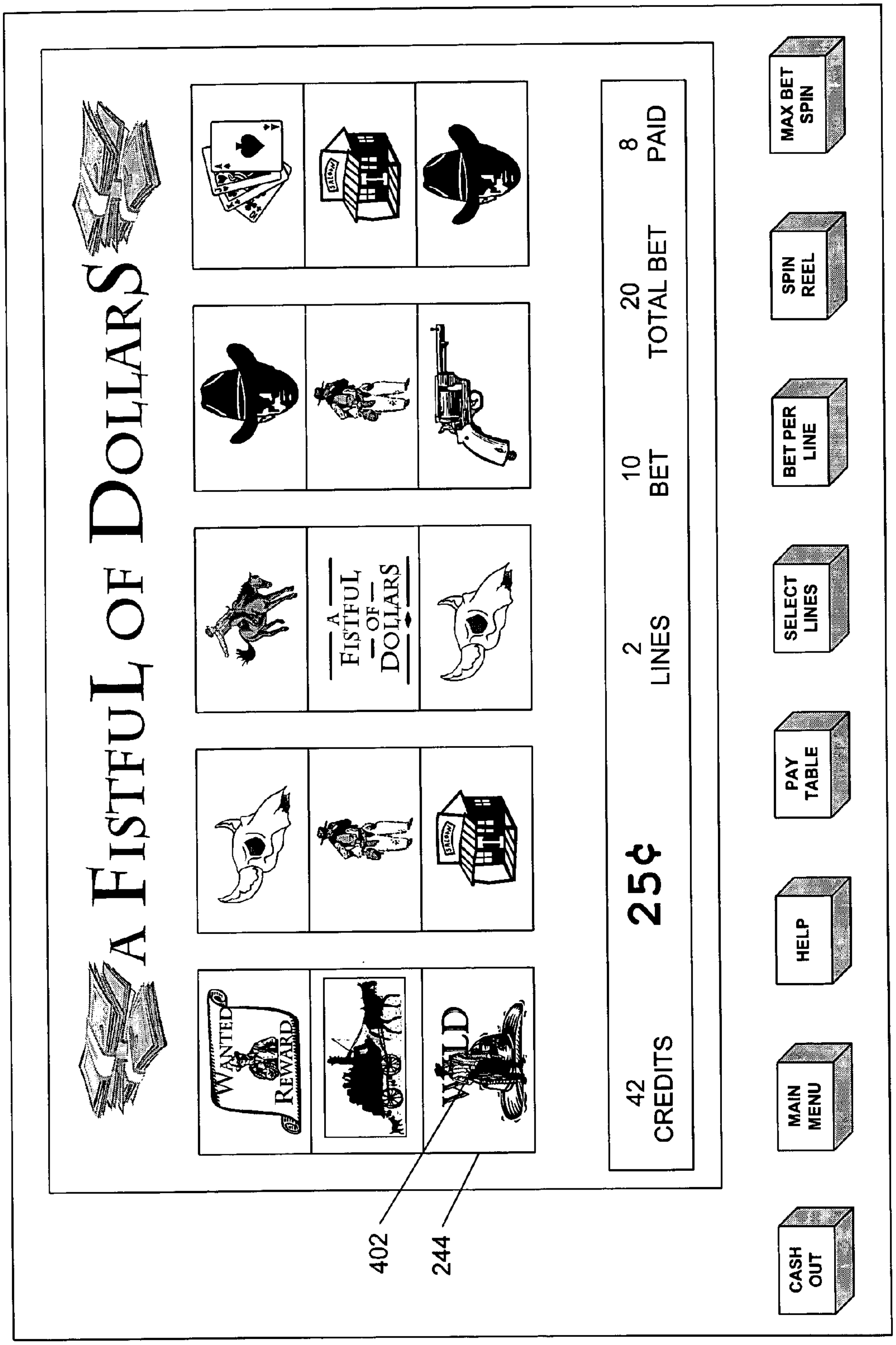
FIGS. 4-7 illustrate example display screens showing a progression of a series of video images, in accordance with the inventive subject matter described herein.

In response to this triggering event, a first image in a series of video images is overlayed over the "Wild" symbol, as depicted in FIG. 4. Specifically, the first image 402 is a reproduced, real image of a cowboy. In one embodiment, some of the sets of video images represent "clips" from a motion picture or television show. For example, a set of video images can represent a clip from the movie "A Fistful of Dollars." Accordingly, the cowboy in the overlay image 402 can be Clint Eastwood, for example. In one embodiment, as explained previously, the set of video images is displayed within a boundary. The boundary can change from image to image, and generally contours to the shape of the main component of the image (e.g., Clint Eastwood) so that the underlying symbol can remain at least partially visible.

Figure 5:
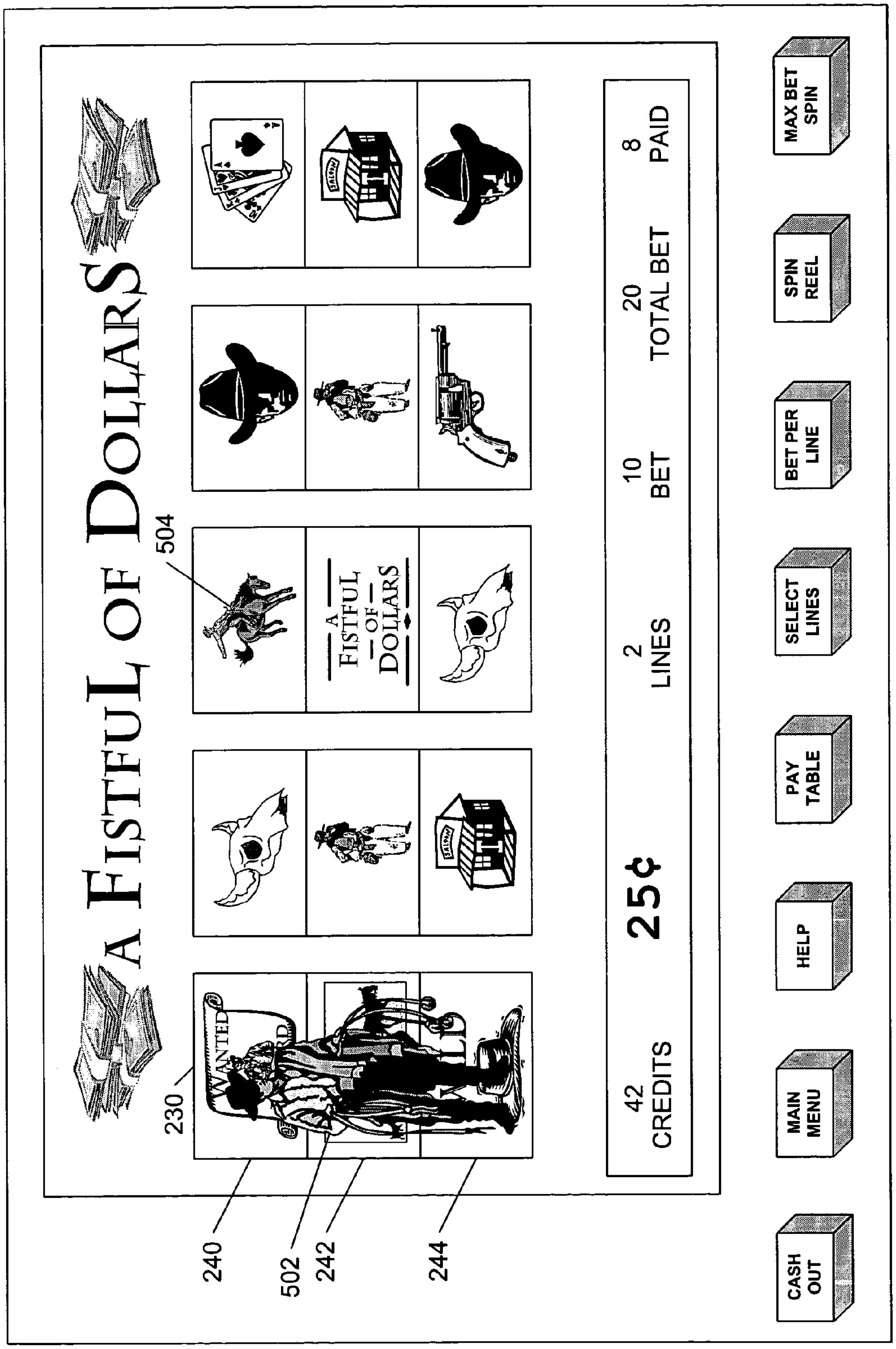

The image can remain substantially within one game element as the images within the set are displayed, or the image can appear to move to other game elements, or expand to be included in multiple game elements, in various embodiments. FIG. 5 represents the screen display of FIG. 4 after the image 402 (FIG. 4) has expanded to be included within multiple symbol areas 240, 242, 244 of the leftmost reel 230. The result is the expanded image 502. Although not shown in FIG. 5, the image can expand into symbol areas within other reels as well. The video images can appear to be dynamic before, during, and after the period of expansion.

Figure 6:
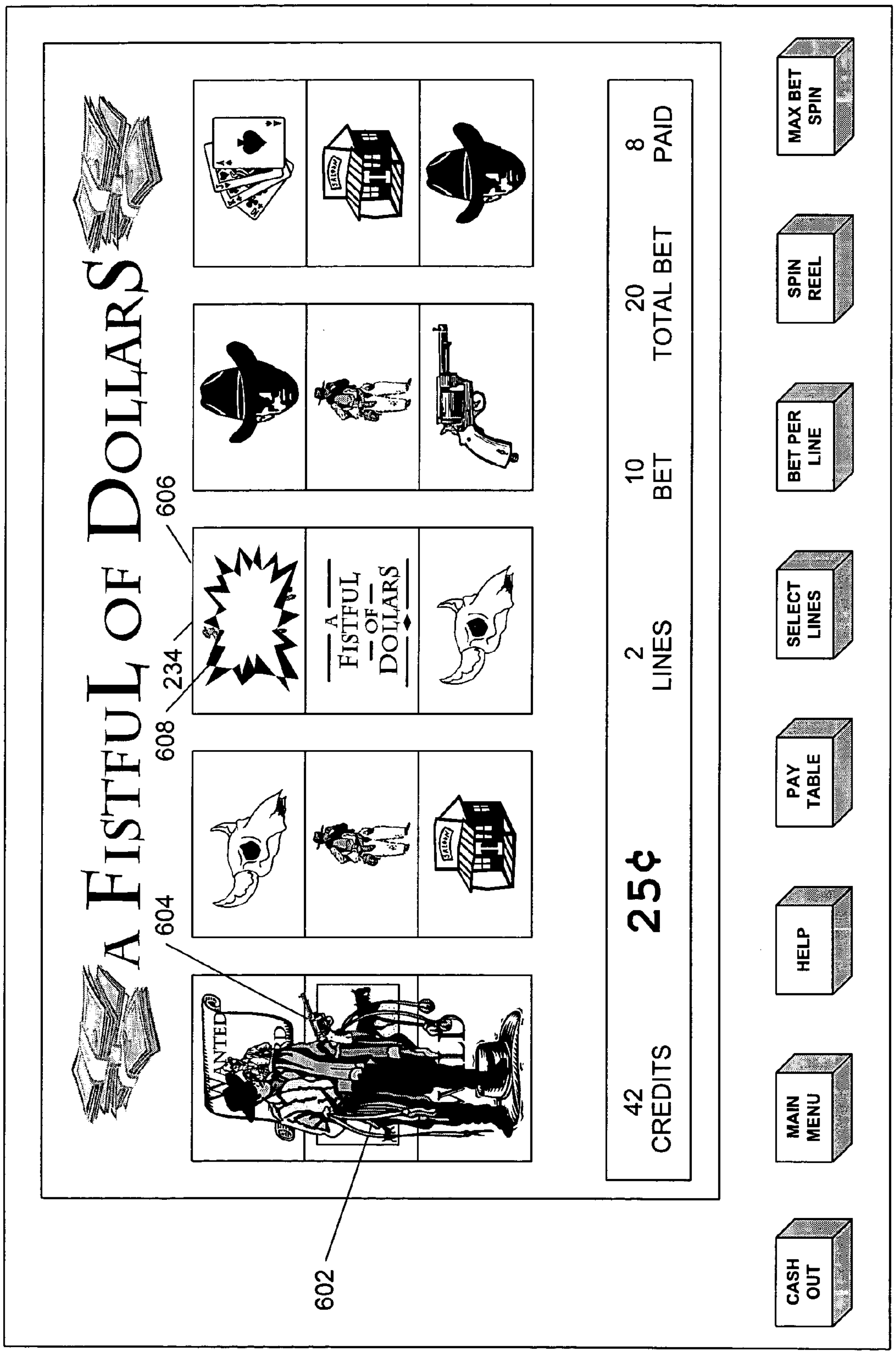
Figure 7:
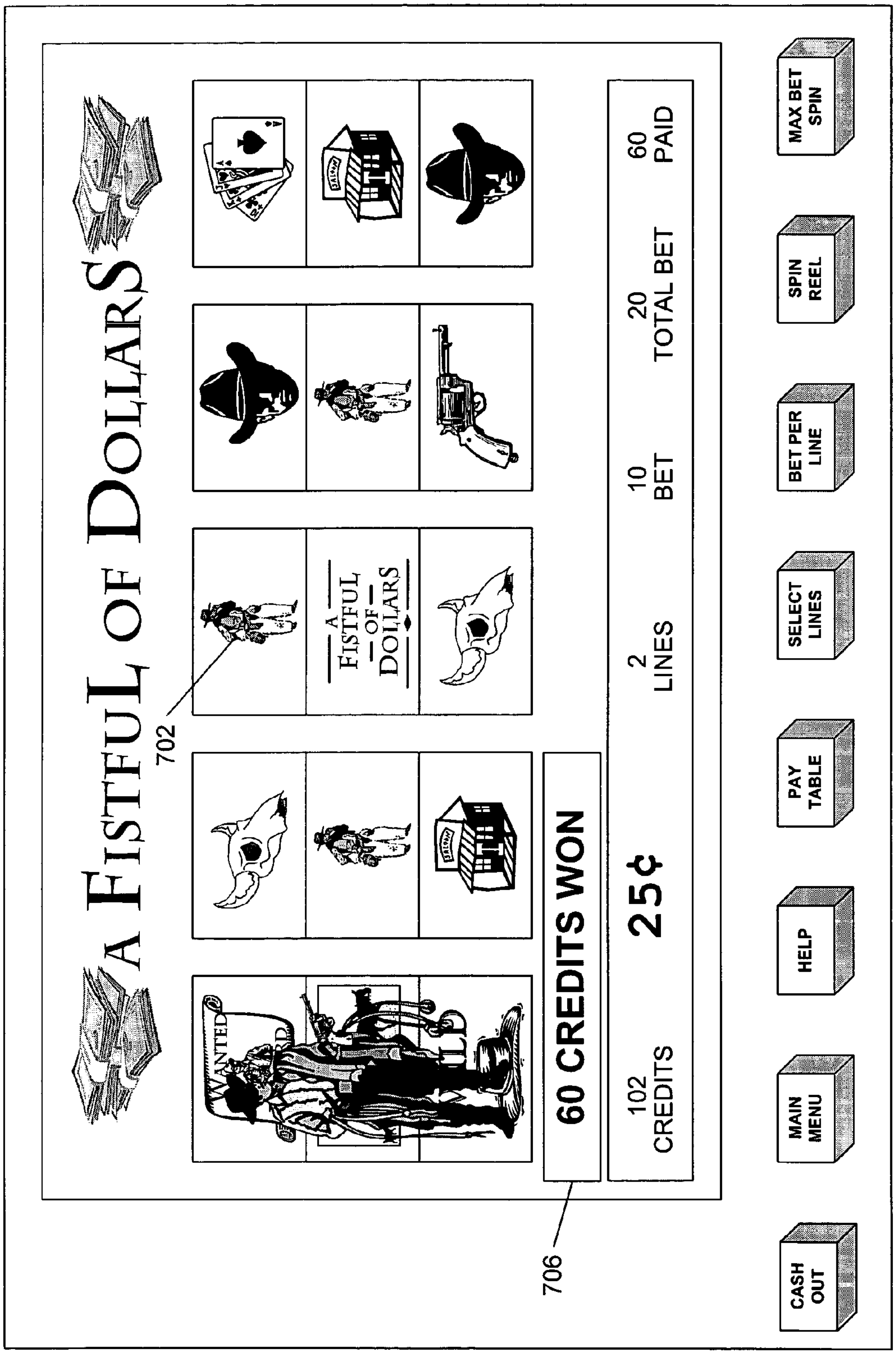

In one embodiment, the system produces an effect that makes it appear as though the video image is affecting one or more game elements. For example, FIG. 6 illustrates the man 602 after he has drawn a gun 604 and shot in the direction of symbol area 606 within reel 234. In synchronization with the apparent shot, the system produces one or more images that simulate an explosion 608. When the explosion dissipates or disappears, the symbol that had been displayed within symbol area 606 has changed, as illustrated in FIG. 7. Instead of the bucking bronco symbol 504 illustrated in FIG. 5, a standing cowboy symbol 702 has taken its place. Accordingly, the set of video images appeared to have affected a game element.

The effect simulated by the set of video images can positively or negatively affect the outcome of the game iteration. In the present example, the effect had a positive outcome, and the player received 60 credits, as indicated in a status window 706 that displays the outcome of the iteration.

Referring back to FIG. 3, if a triggering event has not occurred during an iteration of the game, then the game elements are displayed, in block 316, without the overlying video images. The system then displays the outcome of the game, in block 318, and updates and displays the total number of credits remaining.

A decision is then made, in block 320, whether the player has any remaining credits. If so, then the procedure iterates as shown, and the player has the opportunity to initiate a next iteration. If no credits remain, the game ends.

Figure 8:
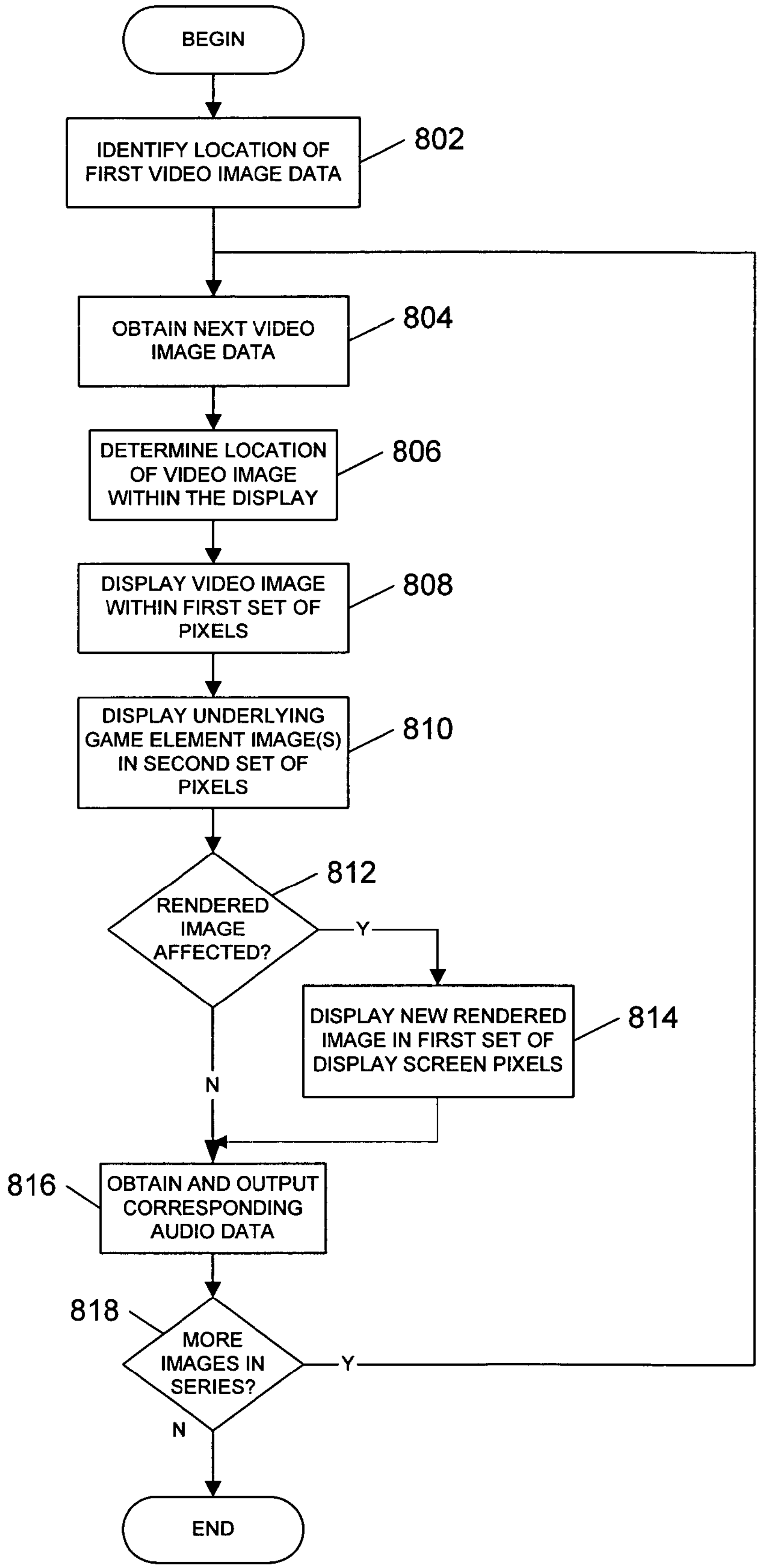
FIG. 8 illustrates a flowchart of a method for overlaying a series of video images, in accordance with the inventive subject matter described herein.

An embodiment of a method for identifying and displaying video images in conjunction with various game elements will now be described. The method can be performed, for example, in conjunction with block 314 of FIG. 3. FIG. 8 illustrates a flowchart of a method for overlaying video images, in accordance with the inventive subject matter described herein.

The method begins, in block 802, by identifying a location of video image data for a first video image within a database. In one embodiment, the database includes a library with multiple sets of video images. For example, each of the multiple sets can represent a clip from a film or television program. Alternatively, each of the multiple sets can include other pre-recorded video information (e.g., a non-publicly displayed video of a person, place or thing).

A particular set of video images can be selected based on the triggering event. For example, if a "Wild" symbol is obtained, a particular clip can be selected. Alternatively, if a triggering event occurs, a set of video images within multiple candidate video images can be selected. The determination of which of the multiple candidates is selected can be made randomly, semi-randomly, sequentially or in some other order.

The location of the video image can be represented as an offset into a database, for example. Alternatively, the location can be represented as an address within a storage device. In a networked embodiment, the location can be represented as a portion of a uniform resource locator (URL) or some other location identifier.

In one embodiment, the set of video image data is stored sequentially. In other words, once the location of the first video image is identified, the subsequent video images are found in sequential storage blocks. Alternatively, the video image data can be dispersed throughout a portion of a memory device.

In block 804, the video image data for the first image to be displayed is obtained. The image data for a particular image can be obtained all at once and stored in a temporary storage location (e.g., RAM or a cache), or it can be obtained in segments. Similarly, the image data for subsequent images can be obtained at the same time the data for preceding images is obtained, or the data for each image can be obtained separately.

The video image data can be stored in compressed or uncompressed format. In addition, the video image data can be stored in association with corresponding audio data, in a manner that enables the video and audio to be synchronously output. Otherwise, the video and audio data can be separately stored, and synchronization of the output streams can be accomplished other ways.

In one embodiment, the video image data is stored in a multiple multicast group (MMG) format. In other embodiments, the video image data can be stored in a Motion joint picture experts group (Motion JPEG) format, or in a motion picture experts group (MPEG) format (e.g., MPEG-1, MPEG-2, etc.). In still other embodiments, the video image data can be stored using other video standards, such as H.261, H.263, etc.

In block 806, a determination is made of the location of the first video image within the display area. For example, all or portions of the first video image can be determined to be located within a single symbol area (e.g., within the triggering symbol), within multiple symbol areas, within other game elements, or elsewhere in the display screen area.

Video monitors generally have an array of pixels which are selectively illuminated to display images on the screen. In order to display an object at a particular location on the screen, video display circuitry in a computer system (e.g., the video controller 146, FIG. 1) connected to the video monitor selects a subset of pixels from the array, and causes the video monitor to illuminate each pixel in the subset using a color that is desired for the object being displayed. Accordingly, the identity of the video image's location can be represented in terms of the locations of one or more pixels.

In block 808, the first video image is displayed at the determined location. In one embodiment, the image may be re-sized to produce a desired aspect ratio or dimensions using conventional techniques such as pixel interpolation. For example, in an embodiment where a set of video images shows a subject expanding or contracting, such techniques can be employed.

As described previously, in one embodiment, each video image is bounded by a shape that does not necessarily conform to the shape of the game element (or elements) within which the image is displayed. Instead, in one embodiment, each video image is bounded by an area that approximately conforms to one or more subjects within the image. Accordingly, a video image is displayed within a first set of pixels that may or may not include substantially all of the pixels of one or more game elements. In one embodiment, the first set of pixels does not include substantially all of the pixels within the one or more game elements.

In addition, in one embodiment, a set of video images is displayed and sized in a manner that portions of the game elements apparently located behind the images are at least partially visible for at least a portion of the time duration of the set of images.

Accordingly, in one embodiment, the underlying images (e.g., the symbols) that are associated with a game element are displayed, in block 810, within a second set of pixels of the game element (or elements). In one embodiment, the first set of pixels and the second set of pixels are substantially mutually exclusive. Accordingly, the video image appears to be opaque.

In another embodiment, the video overlay appears to be semi-transparent. Accordingly, a modified version of the underlying image and the video image can be displayed within the first set of pixels, as well. In this embodiment, three attributes can be associated with each pixel to be used to display the video image. These attributes are a foreground color, a background color, and a transparency factor. The foreground color for a particular pixel is the color of a foreground object (e.g., the video object) positioned at that pixel location at a particular point in time. The background color for a particular pixel is the color of the background (e.g., the symbol and symbol background) at that pixel location. The background color may be understood as the color a particular pixel would be if the ideal shape of the foreground object did not occupy any portion of that pixel location. The transparency factor is a fractional value that defines a desired mixture of the foreground color and the background color for a particular pixel. The foreground color, background color, and transparency factor can be used to determine a mixed color, which preferably has the appearance of being a mixture of the foreground color and the background color.

Blocks 808 and 810 indicate that separate processing is performed to produce the effect that the video image is overlayed over a symbol or other game element. In an alternate embodiment, the video image data and the symbol (or other) data can be pre-combined and stored together for access during play.

In one embodiment, a determination is made, in block 812, whether the particular video image corresponds with an apparent alteration of a game element. For example, referring again to FIG. 6, the image 602 of the cowboy firing the gun 604 corresponds with an apparent alteration of the symbol window 606. Specifically, an explosion 608 appears to occur spontaneously within window 606 as a result of the gunfire. Other game elements also can be similarly affected. For example, the number of bonus spins can be increased or decreased, a new multiplier can be indicated, and/or the number of total credits can be altered.

If a game element is designated to be affected by the image, then an altered image of the game element is displayed, in block 814. The altered image can be the final image to be displayed during the game iteration, or it can be the first of a series of images to be displayed. For example, upon firing of the gun 604, the symbol within symbol window 606 can immediately change to another symbol (e.g., symbol 702, FIG. 7), without the intervening explosion effect. Alternatively, the first altered image can include a first depiction of the explosion 608, which may or may be followed by other related images (e.g., images showing the explosion expanding or contracting) before reaching the final image (e.g., symbol 702). The series of images for the affected game element can be rendered images, video images, or a combination of both.

In block 816, the audio output corresponding to the various images is obtained and output. In one embodiment, the audio data is stored in a format that facilitates audio and video synchronization (e.g., MPEG). In another embodiment, the audio data can be synchronized using additional processes.

A determination is made, in block 818, whether more images exist in the series of images being overlayed. If so, then the process iterates as shown. The next video image data is obtained and displayed, etc. If no more images exist in the series of images, then the process ends. While ending the process, the last overlayed image can be apparently removed from the display area, thus displaying the game elements without overlay, or the last image can be retained until a next iteration of the game.

As discussed previously, the inventive subject matter described herein can be used in other types of games and other types of systems. For example, electronic versions of tic-tac-toe type games currently exist, although none currently are known to incorporate the inventive subject matter described herein.

Figure 9:
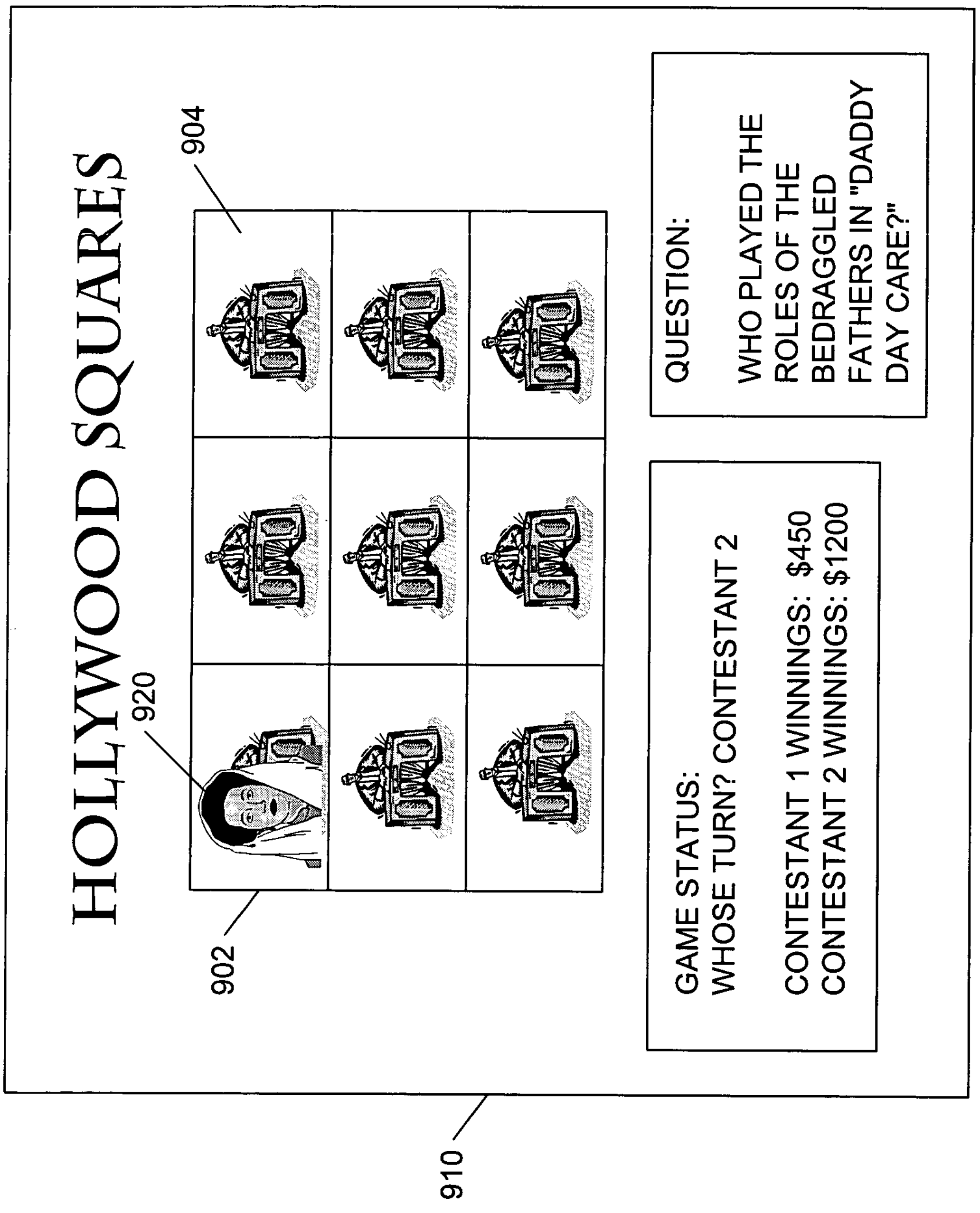
FIG. 9 illustrates a display screen capture of another type of game showing a video image within a game element, in accordance with the inventive subject matter described herein.

FIG. 9 illustrates a display screen capture of showing a video image within a game element of a tic-tac-toe type of game, in accordance with the inventive subject matter described herein. In one embodiment, aspects of the inventive subject matter are incorporated into an electronic tic-tac-toe game that simulates the Hollywood Squares game show.

In the Hollywood Squares game, the system places an "X" or "O" in a square of a tic-tac-toe grid if a contestant is able to answer a trivia question correctly. On the game show set, the tic-tac-toe grid is represented by a large, three-story structure, with chambers that correspond to the squares within the grid. A guest celebrity sits within each chamber. During its turn, a player chooses a square and is asked a trivia question. The guest celebrity provides input to attempt to help the contestant to answer the trivia question correctly.

In one embodiment, a tic-tac-toe grid 902 is electronically represented on a display 910, where each square 904 is considered a game element. Triggering events can be, for example, a player's selection of a square 904, a player's solicitation of the guest celebrity's input, a player's correct or incorrect answer to a trivia question, or the beginning or end of a round. Other triggering events also can occur.

When a triggering event occurs, a set of video images of the associated celebrity are overlayed over the celebrity's square, in one embodiment. For example, a first image 920 of a celebrity is shown in the uppermost left square 904. The set of video images can show the celebrity attempting to answer a question, or can show the celebrity engaging in humorous banter, for example. The video images can be displayed in conjunction with only the game element corresponding to the celebrity's square, or the video image can be expanded to cover multiple squares. Alternatively, the video images can be displayed in a separate area from the grid.

In one embodiment, the video images are overlayed over the game element, as was discussed previously. In one embodiment, the images are displayed within a boundary that roughly contours to the shape of the guest celebrity's head. Accordingly, in one embodiment, it is possible for the player to see at least a portion of the square 902 associated with the celebrity. In one embodiment, the guest celebrity video overlay appears to be opaque. In another embodiment, the video overlay appears to be semi-transparent, as discussed above.

The various embodiments, above, describe a system and method for displaying a set of overlayed video images in conjunction with rendered game elements, such as slot machine symbols or squares in a tic-tac-toe game. Overlayed video images can be displayed in conjunction with other types of game elements, as well. For example, but not by way of limitation, game elements associated with the overlay process can include: roulette wheel slots; bingo or keno squares; die faces; card faces; other game show elements; and electronic characters, vehicles, destinations and/or obstacles.

The overlayed images of the described embodiments are described as video or other real images. In an alternate embodiment, the set of overlayed images can be rendered, rather than being actual images of real things. The overlayed images can appear realistic or fanciful, as with animated images. In addition, in another alternate embodiment, some or all of the game elements can be actual images of real things.

The various procedures described herein can be implemented in software, firmware or hardware. A software implementation can use microcode, assembly language code, or a higher-level language code. The code and the image data may be stored on one or more volatile or non-volatile computer-readable media during execution or at other times. These computer-readable media may include hard disks, removable magnetic disks, removable game cartridges, removable optical disks, magnetic cassettes, flash memory cards, digital video disks, Bernoulli cartridges, random access memories (RAMs), read only memories (ROMs), and the like.

In the description of the embodiments, above, reference is made to the accompanying drawings, which form a part hereof and show, by way of illustration, specific embodiments in which the inventive subject matter may be practiced. These embodiments are described in sufficient detail to enable those skilled in the art to practice the inventive subject matter, and it is to be understood that other embodiments may be utilized, and that process or mechanical changes may be made, without departing from the scope of the inventive subject matter. It will be recognized that the methods of the various embodiments can be combined in practice, either concurrently or in succession. Various permutations and combinations will be readily apparent to those skilled in the art.

CONCLUSION

Various embodiments of a method and apparatus for displaying overlayed images have been described, along with a description of the incorporation of the embodiments within an electronic system. Modifications that would be apparent to those of skill in the art can be made to the various embodiments to achieve the same results. In particular, but not by way of limitation, the arrangements and interconnections between various, illustrated functional blocks and method steps can be different, and other and different functional blocks and steps can be used to achieve the same function, in substantially the same way, to achieve substantially the same result. Further, the type of system within which the embodiments are incorporated can be different (e.g., it can include more, fewer or different components than those illustrated and described, or the components can be interconnected in different ways). Further, some or all of the functional components can be implemented in software.

Although specific embodiments have been illustrated and described herein, it will be appreciated by those of ordinary skill in the art that any arrangement that is calculated to achieve the same purpose may be substituted for the specific embodiments shown. Many adaptations of the inventive subject matter described herein will be apparent to those of ordinary skill in the art. Accordingly, this application is intended to cover any adaptations or variations of the inventive subject matter. It is manifestly intended that the inventive subject matter be limited only by the following claims and equivalents thereof.

What is claimed is:

1. A method comprising:

displaying a supplemental graphical element over at least one symbol element in one or more displayed reels of a casino gaming machine, the supplemental graphical element comprising pre-recorded video information including full motion video of a person, place or thing, the displaying including overlaying in a memory storing video data pixel values of the at least one symbol element with pixel values of the supplemental graphical element, wherein each of the at least one symbol element that is overlaid remains at least partially visible while the supplemental graphical element is displayed.

2. The method of claim 1, further comprising:

displaying the at least one symbol element;

determining, based on the at least one symbol element, whether a triggering event has occurred; and if a triggering event has occurred, identifying the supplemental graphical element as a set of video images.

3. The method of claim 1, wherein displaying the supplemental graphical element includes dynamically altering a size of the supplemental graphical element.

4. A method comprising:

displaying on a video display at least a portion of a reel symbol element during a play iteration of a casino game; and in conjunction with the display of the reel symbol element, and before the play iteration is completed, displaying a supplemental graphical element so that it appears as an overlay over the reel symbol element, the supplemental graphical element comprising pre-recorded video information including full motion video of a person, place or thing, the displaying including overlaying, in a memory storing video data, pixel values of the reel symbol element with pixel values of the supplemental graphical element, wherein the reel symbol element appears to be at least partially visible during at least a portion of a time period that the supplemental graphical element is displayed.

5. The method of claim 4, further comprising:

determining, based on the at least one symbol elements, whether a triggering event has occurred; and if a triggering event has occurred, identifying the supplemental graphical element as a set of video images.

6. The method of claim 4, wherein displaying the supplemental graphical element includes dynamically altering a size of the supplemental graphical element.

7. An electronic slot machine comprising:

at least one memory to store video data for multiple symbol images and video images;

one or more processors, which cause the multiple symbol images to be displayed, by one or more video display devices, within multiple symbol areas associated with multiple reels, determine based on the multiple symbol images, whether a triggering event has occurred, if a triggering event has occurred, identify a set of video images comprising pre-recorded video information including full motion video of a person, place or thing, and cause the set of video images to be displayed in conjunction with the multiple symbol images by overlaying pixel values of one or more of the multiple symbol images with pixel values of the set of video images, so that the set of video images appears as an overlay over each of the one or more of the one or more multiple symbol images that are overlaid, wherein a portion of a video image within the set is displayed within a first set of pixels within a symbol area, such that a symbol image associated with the symbol area of each of the one or more symbol images that are overlaid is at least partially visible; and one or more display devices, operatively coupled to the one or more processors, which display the multiple symbol images and the set of video images.

8. The electronic slot machine of claim 7, wherein the one or more processors causes a display size of the set of video images to be dynamically altered during the display of the set of video images.

9. The electronic slot machine of claim 7, wherein the one or more processors cause the set of video images to be displayed by causing the set of video images to be displayed in a manner that the set of video images appears as an opaque overlay over each of the one or more of the multiple symbol images that are overlaid.

10. The electronic slot machine of claim 7, wherein the one or more processors cause the set of video images to be displayed by causing the set of video images to be displayed in a manner that the set of video images appears as semi-transparent overlay over each of the one or more of the multiple symbol images that are overlaid.

11. The electronic slot machine of claim 7, wherein the one or more processors further:

determine whether a video image is associated with an alteration of a symbol image within a symbol area; and if the video image is associated with the alteration, cause an altered image to be displayed in the symbol area.

12. The electronic slot machine of claim 7, further comprising:

a money/credit input/output (I/O) device for enabling a player to obtain credits; and player input devices that enable the player to specify a bet and to initiate a spin of the multiple reels.

13. A method for displaying images in an electronic game, the method comprising:

causing multiple game element images to be displayed within multiple game element areas of a video display;

determining based on the multiple game element images, whether a triggering event has occurred;

if a triggering event has occurred, identifying a set of video images comprising pre-recorded video information including full motion video of a person, place or thing; and causing the set of video images to be displayed in conjunction with the multiple game element images by overlaying pixel values of one or more of the multiple game element images with pixel values of the set of video images, so that the set of video images appears as an overlay over each of the one or more of the multiple game element images that are overlaid, such that each of the one or more of the game element images that are overlaid is at least partially visible.

14. The method of claim 13, wherein causing the set of video images to be displayed comprises causing a display size of the set of video images to be dynamically altered during the display of the set of video images.

15. The method of claim 13, wherein causing the set of video images to be displayed comprises:

causing the set of video images to be displayed in a manner that the set of video images appears as an opaque overlay over each of the one or more of the multiple game element images that are overlaid.

16. The method of claim 13, wherein causing the set of video images to be displayed comprises:

causing the set of video images to be displayed in a manner that the set of video images appears as semi-transparent overlay over each of the one or more of the multiple game element images that are overlaid.

17. The method of claim 13, further comprising:

determining whether a video image is associated with an alteration of a game element image within a game element area; and if the video image is associated with the alteration, causing an altered image to be displayed in the game element area.

18. The method of claim 13, wherein the electronic game is a game designed for execution on a wagering game machine, and causing the set of video images to be displayed comprises causing the set of video images to be displayed on a video display device coupled to the wagering game machine.

19. The method of claim 18, wherein the electronic game is an electronic slot machine game, and the multiple game elements include multiple symbol areas, and the multiple game element images includes multiple symbols displayed within the multiple symbol areas.

20. A method for displaying images in an electronic slot machine game, the method comprising:

causing multiple symbol images to be displayed on a video display within multiple symbol areas associated with multiple reels;

determining based on the multiple symbol images, whether a triggering event has occurred;

if a triggering event has occurred, identifying a set of video images comprising pre-recorded video information including full motion video of a person, place or thing; and causing the set of video images to be displayed in conjunction with the multiple symbol images by overlaying pixel values of the multiple symbol images with pixel values of the set of video images, so that the set of video images appears as an overlay over each of one or more of the multiple symbol images that are overlaid, wherein the set of video images are displayed such that a symbol image associated with the symbol area of each of the one or more of the multiple symbol images that are overlaid is at least partially visible.

21. The method of claim 20, wherein causing the set of video images to be displayed comprises causing a display size of the set of video images to be dynamically altered during the display of the set of video images.

22. The method of claim 20, wherein causing the set of video images to be displayed comprises:

causing the set of video images to be displayed in a manner that the set of video images appears as an opaque overlay over each of the one or more of the multiple symbol images that are overlaid.

23. The method of claim 20, wherein causing the set of video images to be displayed comprises:

causing the set of video images to be displayed in a manner that the set of video images appears as semi-transparent overlay over each of the one or more of the multiple symbol images that are overlaid.

24. The method of claim 20, further comprising:

determining whether a video image is associated with an alteration of a symbol image within a symbol area; and if the video image is associated with the alteration, causing an altered image to be displayed in the symbol area.

25. A non-transitory computer-readable medium having program instructions stored thereon to perform a method, which when executed within an apparatus, result in:

causing multiple game element images to be displayed within multiple game element areas on a video display;

determining based on the multiple game element images, whether a triggering event has occurred;

if a triggering event has occurred, identifying a set of video images comprising pre-recorded video information including full motion video of a person, place or thing; and causing the set of video images to be displayed in conjunction with the multiple game element images by overlaying pixel values of the multiple game element images with pixel values of the set of video images, so that the set of video images appears as an overlay over each of one or more of the multiple game element images that are overlaid, such that each of the one or more of the game element images that are overlaid is at least partially visible.

26. The non-transitory computer-readable medium of claim 25, wherein causing the set of video images to be displayed comprises causing a display size of the set of video images to be dynamically altered during the display of the set of video images.

27. The non-transitory computer-readable medium of claim 25, wherein causing the set of video images to be displayed comprises:

causing the set of video images to be displayed in a manner that the set of video images appears as an opaque overlay over each of one or more of the multiple game element images that are overlaid.

28. The non-transitory computer-readable medium of claim 25, wherein causing the set of video images to be displayed comprises:

causing the set of video images to be displayed in a manner that the set of video images appears as semi-transparent overlay over each of the one or more of the multiple game element images that are overlaid.

29. The non-transitory computer-readable medium of claim 25, executing the program instructions further result in:

determining whether a video image is associated with an alteration of a game element image within a game element area; and if the video image is associated with the alteration, causing an altered image to be displayed in the game element area.

30. A casino game comprising:

at least one memory for storing a supplemental graphic element and data for symbol elements, the supplemental graphical element comprising pre-recorded video information including full motion video of a person, place or thing;

a video display; and a computer-readable medium having program instructions stored thereon to perform a method, which when executed within the casino game, result in:

the display displaying the supplemental graphical element over at least one symbol element of the symbol elements in one or more displayed reels of the casino game, wherein the method includes overlaying pixel values of the at least one symbol element with pixel values of the supplemental graphical element and further wherein each of the at least one symbol element that is overlaid remains at least partially visible while the supplemental graphical element is displayed.

31. The casino game of claim 30, wherein executing the program instructions further results in:

the display displaying the at least one symbol element;

determining, based on the at least one symbol element, whether a triggering event has occurred; and if a triggering event has occurred, identifying the supplemental graphical element as a set of video images.

32. The casino game of claim 30, wherein displaying the supplemental graphical element includes dynamically altering a size of the supplemental graphical element.

33. The method of claim 1, wherein displaying the supplemental graphical element includes displaying the supplemental graphical element within a boundary determined by a component of the supplemental graphical element.

34. The method of claim 4, wherein displaying the supplemental graphical element includes displaying the supplemental graphical element within a boundary determined by a component of the supplemental graphical element.

35. The method of claim 13, wherein causing the set of video images to be displayed includes displaying the set of video images within a boundary determined by a component within an image of the set of video images and wherein the boundary changes from a first image of the set of video images to a second image of the set of video images, the boundary changing in accordance with changes in the component.

36. The computer-readable medium of claim 25, wherein causing the set of video images to be displayed includes displaying the set of video images within a boundary determined by a component within an image of the set of video images.

* * * * *